Patented Dec. 25, 1951

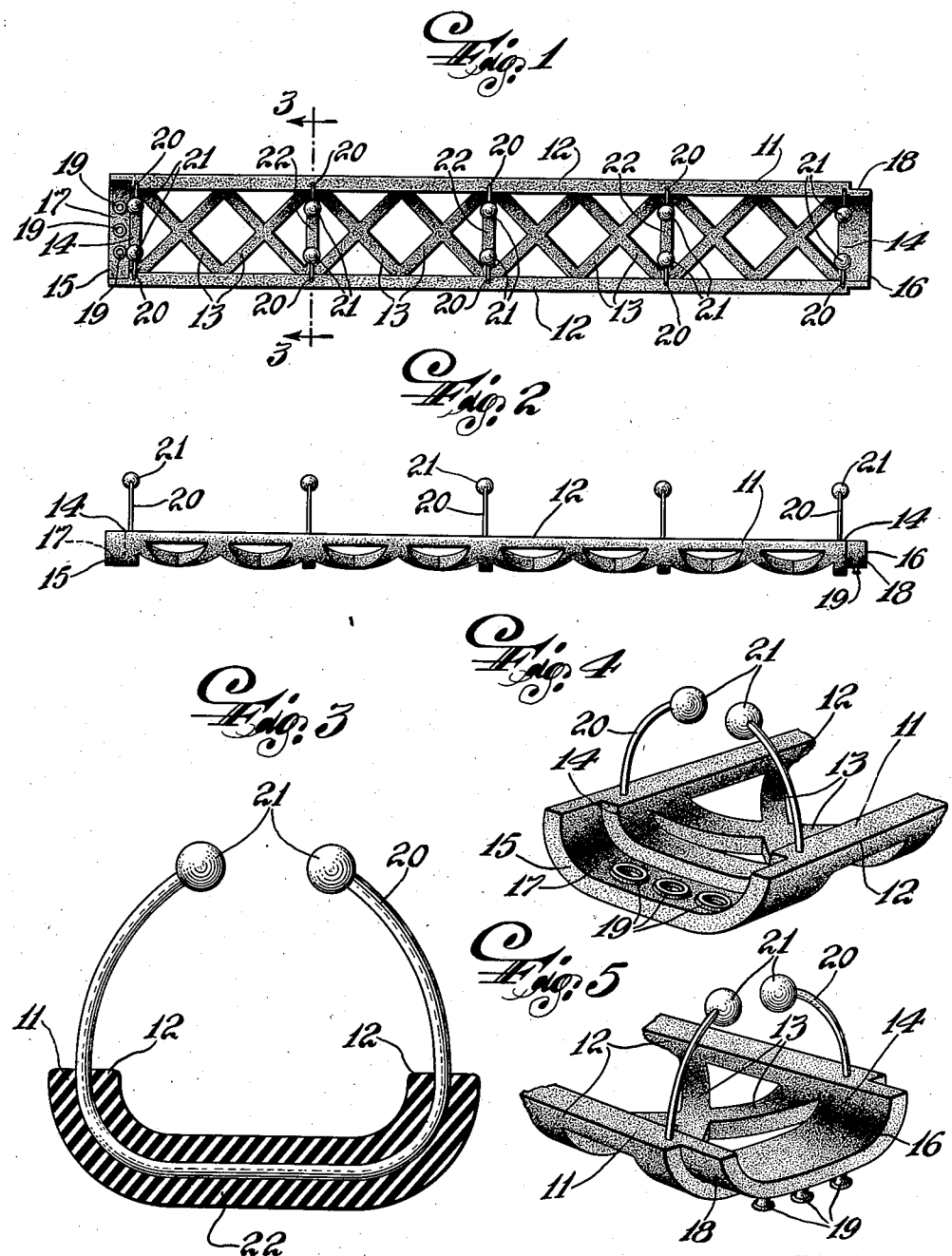

2,580,272

UNITED STATES PATENT OFFICE 2,580,272

SELF-ATTACHING TRACTION TREAD

Philip W. Bell, Nutley, N. J.

Application November 24, 1948, Serial No. 61,800

3 Claims. (Cl. 152—221)

My invention relates generally to traction treads, and specifically to self-attaching traction treads.

It is among the objects of my invention to provide a traction tread that attaches itself to the wheel of a motor vehicle.

It is another object of my invention to provide a traction tread equipped with a series of clamps for holding the tread to the wheel of a motor vehicle.

Yet another object of my invention is to provide a traction tread whose ends are attached together whereby a continuous circle is formed.

It is still a further object of my invention to provide a traction tread yieldable to pressure that will conform to the shape of the wheel of a motor vehicle.

Yet a further object of my invention is to provide a traction tread which is simple in form easy to attach and detach, and durable.

These objects and advantages, are attained by the device illustrated in the drawings, in which Figure 1 is a top view of my self-attaching traction tread;

Figure 2 is a side view;

Figure 3 is a cross-section taken on the line 3—3 in Figure 1;

Figure 4 is a view of one end of the tread; and

Figure 5 is a view of the other end of the tread.

Referring now to the drawings in detail, my invention has a body member formed of a multiplicity of parts. I refer to these parts collectively as the body member or tread 11. The tread 11 has longitudinal or side members 12 which are strips which extend the length of the body member 11. These side members 12 are two in number, one being intended to be disposed on each side of an auto tire whereby a lattice or tread 11 covers the surface of the automobile tire. The side members 12 are joined by a plurality of cross members 13 which serve to attach together the side members 12 and maintain them parallel and in spaced relation to each other. I have chosen to show these cross members 13 in my drawing as being disposed in a crisscross fashion, but they need not crisscross, but may be disposed ladder-like across the side members 12, or in any other manner desired as long as they supply the necessary traction or gripping effect when in contact with the pavement. The side members 12 have additional cross members at their ends which serve as terminal members 14. The terminal members 14 each have corresponding tongues 15, 16 formed on each end thereof. The tongues may be approximately one-half the thickness of the tread and one is formed on the upper and the other on the lower side of the terminal members 14. Thus, when the ends of the tread 11 are brought together, the tongues will overlap each other. On the opposite faces 17, 18 of the tongues, fasteners 19 are attached. These fasteners 19 are engageable with the corresponding fastener disposed on the opposite faces 17, 18 so that the terminal members 14 are firmly engaged together.

Passing through each of the terminal members 14, there is a clip 20 which may have a ball 21, or a notch formed at its end. These clips serve to engage the wheel of the automobile to which the tread 11 is applied. At suitable points along the body member 11, additional clips may be located. These clips pass through the tread through clip cross-members 22.

I prefer the tread itself to be formed of a hard but flexible rubber, but plastics or other materials may be used. The fasteners 19 may be of the conventional snap or pressure engageable variety, many of which are on the market and well known. The clips 20 should be formed of a resilient metal and may be imbedded deeply in the tread. The end of the clips may be formed with metal balls 21. These balls should be spaced apart such a distance that a tire will force them more widely apart and the clips 20 will then be caused to embrace the tire and hold the tread thereon.

The use of my self-attaching traction tread is as follows. The tread is laid down on the pavement in front of the auto tire, as shown in Figure 2. The auto is slowly driven forward on to the tread. When the tire encounters the first clip 20, it engages the balls 21 and it forces the clip 20 apart until it snaps into place around the tire holding the tread firmly to the tire. The same thing is repeated as the tire encounters each succeeding clip 20 until the end of the tread 11 is reached. Since the tread is rather precisely sized, the tongues will overlap in such a manner as to bring the corresponding fasteners 19 into engagement with each other. The pressure of the wheel will cause the fasteners 19 to engage each other and the ends of the tread will be firmly fastened together. Removal of the tread 11 is effected by manually unfastening the fasteners 19. The end of the tread is then held stationary while the motor vehicle is then slowly moved forward; the clips 20 will disengage themselves until the tread 11 is entirely free of the tire. It should be noted that the width of the tread 11 is such that the side members 12 of the tread 11 are not in contact with the pavement, but only the cross members 13. The cross members 13 supply the necessary traction for getting through snow or traversing icy pavements.

Many changes may be made in the construction, selection and arrangement of the various parts of my invention, all within the scope of the appended claims without departing from the spirit of the invention.

I claim:

1. A self-attaching traction tread for motor vehicles comprising a tread, arcuate in cross section, including longitudinal members, and latitudinal members which connect together the longitudinal members; semi-circular resilient clips each extending through the longitudinal members and through a latitudinal member and engageable with a motor vehicle wheel, in embracing relationship, and a fastener attached to one end of the tread and engageable with a cooperative fastener attached to the other end of the tread.

2. A self-attaching traction tread for motor vehicles comprising a tread, arcuate in cross section, including longitudinal members, and latitudinal members which connect together the longitudinal members; semi-circular resilient clips each extending through the longitudinal members and through a latitudinal member and engageable with a motor vehicle wheel, in embracing relationship, a fastener attached to one end of the tread and engageable with a cooperative fastener attached to the other end of the tread, and ball members on the ends of each clip.

3. A self-attaching traction tread for motor vehicles comprising a tread, arcuate in cross section, including longitudinal members, and latitudinal members which connect the longitudinal members together; semi-circular resilient clips each extending through the longitudinal members and through a latitudinal member and engageable with a motor vehicle wheel, in embracing relationship, said clips being normally disposed perpendicular to the tread, a fastener attached to one end of the tread and engageable with a cooperative fastener attached to the other end of the tread, and ball members on the ends of each clip.

PHILIP W. BELL.

REFERENCES CITED

The following references are of record in the file of this patent:

UNITED STATES PATENTS

| Number | Name | Date |
|---|---|---|
| 963,667 | Vergote | July 5, 1910 |
| 1,208,149 | Haning | Dec. 12, 1916 |
| 1,680,569 | Richie | Aug. 15, 1928 |
| 1,908,808 | Auciunas | May 16, 1933 |
| 2,106,670 | Walker | Jan. 25, 1938 |
| 2,142,315 | Hershey | Jan. 3, 1939 |